June 18, 1963 W. G. BROWN 3,094,667

NOISE REDUCING CIRCUIT EMPLOYING THE INFORMATION ON BOTH LEADING AND TRAILING EDGES OF RECEIVED PULSES

Filed Oct. 29, 1958 2 Sheets-Sheet 1

Inventor
WARREN G. BROWN
By Alfred C. Hill
Agent

June 18, 1963 W. G. BROWN 3,094,667

NOISE REDUCING CIRCUIT EMPLOYING THE INFORMATION ON BOTH LEADING AND TRAILING EDGES OF RECEIVED PULSES

Filed Oct. 29, 1958 2 Sheets-Sheet 2

Inventor
WARREN G. BROWN
By Alfred C. Hill
Agent 3,094,667
Patented June 18, 1963

3,094,667

NOISE REDUCING CIRCUIT EMPLOYING THE INFORMATION ON BOTH LEADING AND TRAILING EDGES OF RECEIVED PULSES

Warren G. Brown, Cedar Grove, N.J., assignor to International Telephone and Telegraph Corporation, Nutley, N.J., a corporation of Maryland Filed Oct. 29, 1958, Ser. No. 770,551
20 Claims. (Cl. 328—162)

Figure 1:
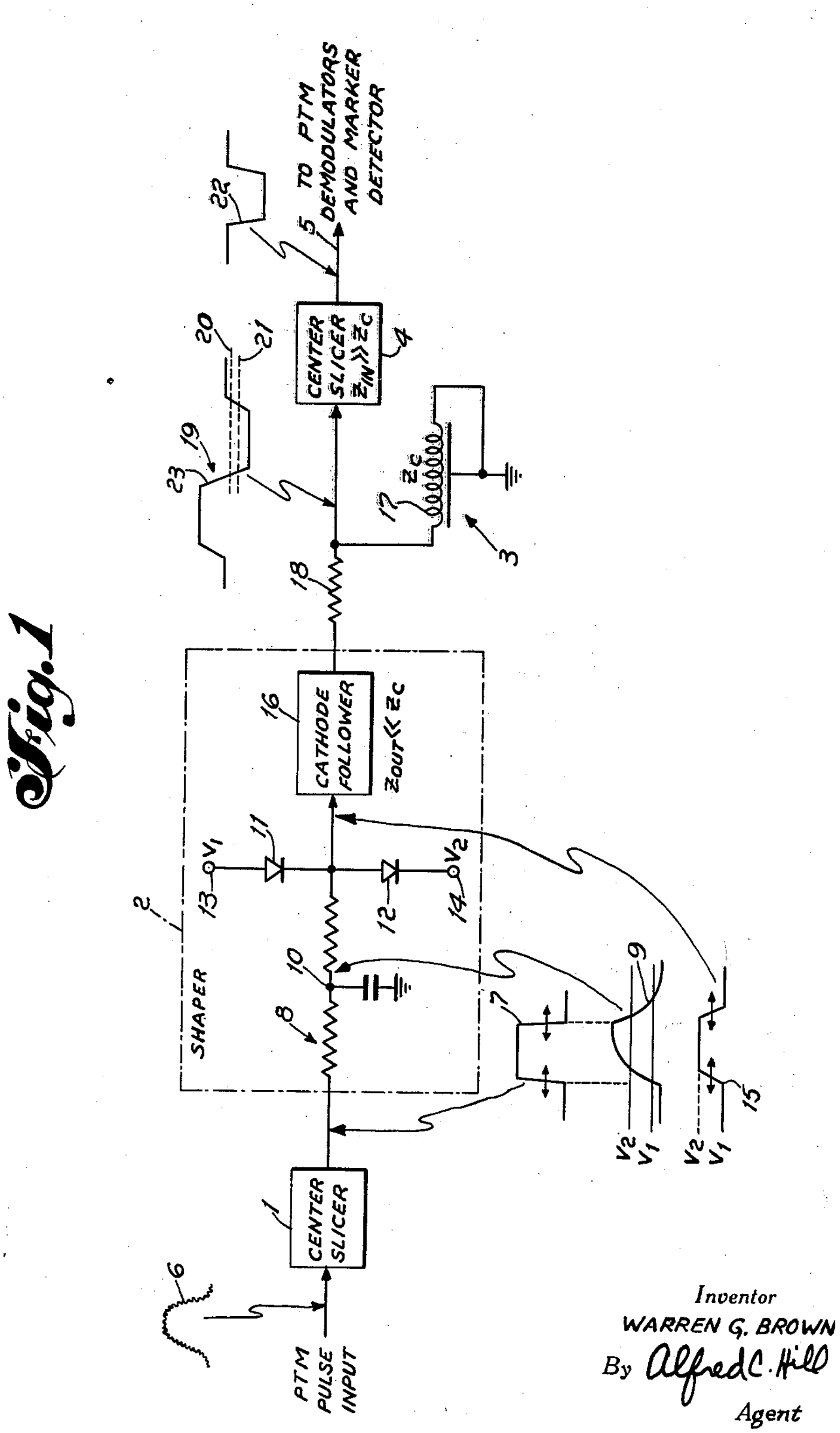

This invention relates to pulse communication systems and more particularly to a circuit for reducing the noise in pulse communication systems.

In many pulse communication systems noise in the system has the effect of varying or shifting the time position of the leading and trailing edges of the pulse carrying the intelligence. In pulse systems, such as pulse time modulation (PTM) systems, a pulse of constant width is caused to vary in time relative to a marker pulse in accordance with the information to be transmitted. Noise present in such a pulse communication system would affect the timing of the leading and trailing edges of the constant width pulse and hence the width of the pulse. Upon demodulation of such a pulse there would be experienced a noise due to this jitter or varying time of the leading and trailing edges of the pulse. It is desirable to increase the signal-to-noise ratio of any communication system and it is particularly desirable in pulse communication systems, particularly where such pulse systems are utilized for over-the-horizon or long distance communication links where intelligibility is desired. Any simple system that will increase the signal-to-noise ratio even a small amount is welcomed in the communication art.

In prior art arrangements it has been customary to slice and shape the incoming PTM pulse and to use the leading edge of the pulse to control the width of a timing pulse which then enables the recovery of the intelligence. It is further possible to employ very similar circuits with slight modifications which would be controlled by the trailing edge of the pulse with the identical information being recovered from the pulse. If these two systems were tied in parallel at their inputs and outputs, the audio signal would be double the amplitude, as the two identical signals would be added together linearly. There is also noise on each of the pulse edges with the noise being almost exactly the same in average magnitude but in random instantaneous relationship. Under these conditions, the sum of the noise is the square root of the sum of the squares of the two noises. This will give a noise only 41 percent greater than the individual noise as compared with 100 percent greater signal. Hence, there results an increase of the signal-to-noise ratio by 41 percent or 3 db.

One disadvantage of this system is that the majority of the equipment is duplicated.

Therefore, an object of this invention is to provide a circuit which will effectively increase the signal-to-noise ratio of a communication system without duplication of equipment.

Still another object of this invention is the provision of a circuit to improve the signal-to-noise ratio of a pulse communication system employing the least amount of simple equipment in addition to the required communication equipment.

Still another object of this invention is to provide a system employing the information on both the leading and trailing edges of a pulse to generate a new pulse whose leading edge has a time position representative of the time position of both the leading and trailing edges of the received pulse.

Still a further object of this invention is to provide a circuit to improve the signal-to-noise ratio of a pulse communication system by reducing the amount of noise present on the received pulse.

A feature of this invention is the provision of a means including a storage device to produce a pulse having the time position of the leading edge thereof correspond in time to the combined time position of the leading and trailing edges of the received pulse with equal weighting.

Another feature of this invention is the provision of a storage device coupled to the output of the receiver, a means to combine the output of the receiver and the output of said storage device to determine the shift of the time center of the received pulses due to noise and means to produce pulses having a leading edge whose time position is shifted an amount equal to the time shift of the time center of the received pulses due to noise.

Still another feature of this invention is the provision of a slicer to slice an input pulse at its half amplitude point, the output of which is operated upon by a shaper to shape the resultant sliced pulse to have equal slope on both the leading and trailing edges controlled to have a duration of the same order of magnitude as the expected time shift caused on the edges of the pulse due to the noise. The output of this shaper is then applied to a short-circuited delay line such that the input pulse and the delayed and inverted counterpart thereof may be added to one another to produce a pulse by algebraic addition whose leading edge has a time position equal to the time position shift of the time center of the received pulse. This resultant pulse is then applied to a center slicer which operates to produce a new pulse whose leading edge is equal to approximately 71 percent of the jitter or time shift experienced by the input pulse.

Figure 2:
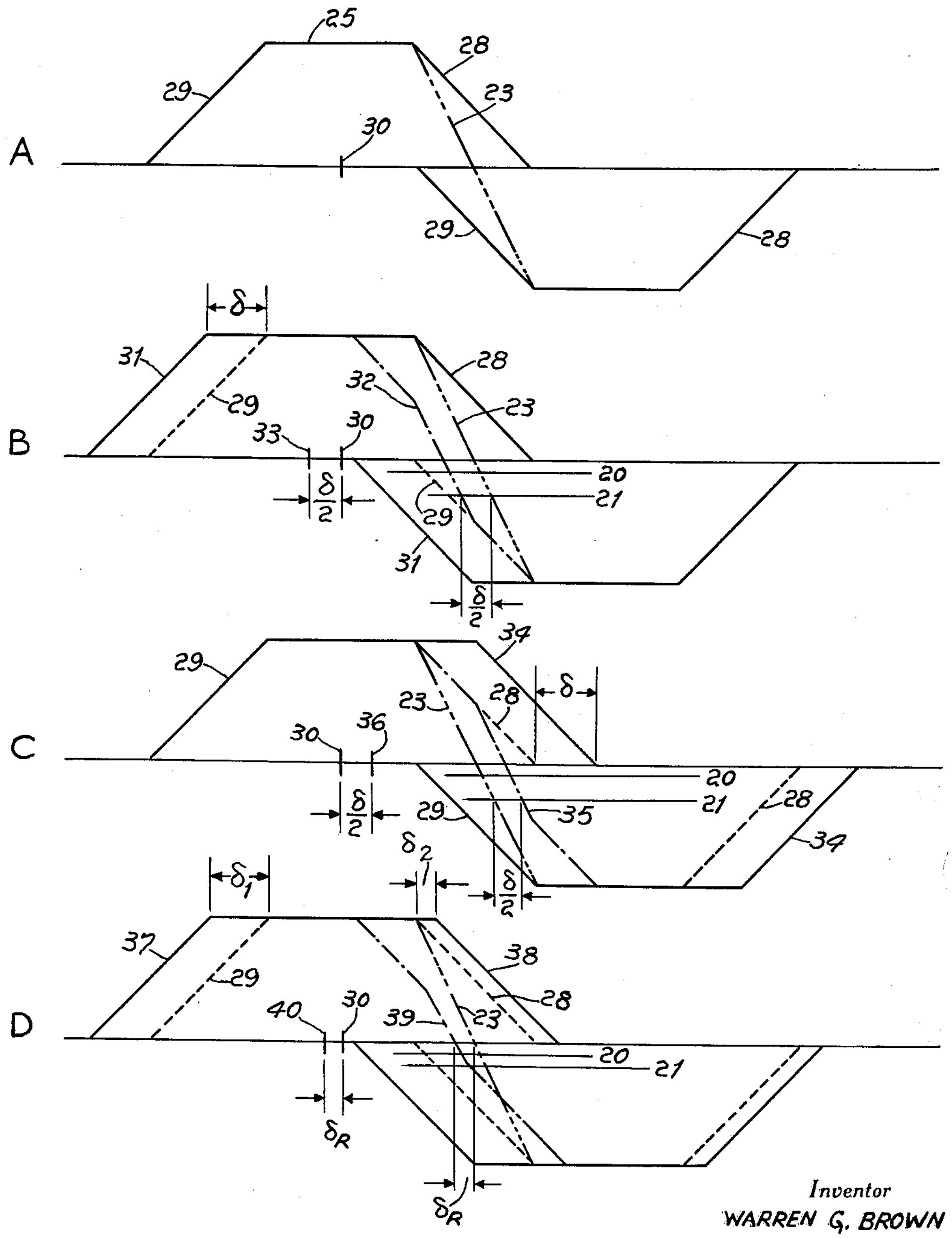

The above-mentioned and other features and objects of this invention will become more apparent by reference to the following description taken in conjunction with the accompanying drawings, in which:

FIG. 1 is a schematic diagram in block form illustrating the noise reducing circuit of this invention; and FIG. 2 is a series of curves illustrating certain conditions of the received pulse and the resultant pulse achieved in the operation of FIG. 1.

Referring to FIG. 1, the noise reducing circuit of this invention is illustrated as comprising a center slicer 1, a pulse shaper 2, a storage device 3, and a center slicer 4. The combined and cooperative operation of these components operate to produce a pulse at the terminal 5 whose time position of the leading edge corresponds in time to the combined time position of the leading and trailing edges of the pulse applied at the input of center slicer 1. This may be stated in another way in that the cooperative arrangement of units 1 to 4 produce at terminal 5 a pulse whose leading edge has a time position shifted an amount equal to the time shift of the time center of the pulses of said source when the pulses of a pulse communication system are under the influence of noise or jitter on the pulse.

An input pulse 6 having an appreciable amount of noise is applied to the input of center slicer 1, said center slicer 1 operating to remove a slice at approximately 50 percent of the amplitude of pulse 6 to produce a relatively steep-sided pulse substantially as illustrated by pulse 7. The noise carried on the input pulse of center slicer 1 imparts a shift in time position to the leading and trailing edges of the input pulse substantially as indicated by the arrows on pulse 7. This time shift or jitter of the edges of the pulse is of substantially the same magnitude but random in nature, since the noise itself is random in nature. Hence, the leading edge could have noise and the trailing edge not have noise or the leading edge could be shifted in one direction while the trailing edge is shifted in another direction or the trailing edge could be shifted while the leading edge is not shifted due to the noise in the system. The output of center slicer 1 as illustrated in curve 7 is applied to the time constant circuit 8 which produces a pulse substantially as illustrated by curve 9 at point 10. The waveform at point 10 is coupled to the slicer or clipping circuit represented by diodes 11 and 12, said diodes having a potential $V_1$ and $V_2$ applied thereto as illustrated at terminals 13 and 14, respectively, to establish the level and amplitude of the pulse that will be removed from the waveform of pulse 9. Thus, the voltage $V_1$ applied at terminal 13 sets the level above which voltage will pass and is represented in curve 9 by the line labeled $V_1$. The voltage $V_2$ applied at terminal 14 sets the upper limit above which no current will pass to the input of the cathode follower and is labeled $V_2$. The value of $V_1$ and $V_2$ and the time constant circuit 8 is so chosen that there is a portion on the waveform 9 where the leading and trailing edges are substantially identical in slope which is required in the operation of this circuit. Hence, also the slope must be such that it has a duration of the same order of magnitude as the expected noise jitter or time position shift due to noise. By so arranging the shaper circuit as outlined hereinabove, the resultant waveform shown by waveform 15 is coupled to the storage device 3, which is illustrated herein to be a short-circuited delay line 17. The requirements set forth above on the shape of pulse 15 is to reduce the amplitude of the high frequency components which would not be able to pass through delay line 17 without appreciable distortion by bandwidth limitation. It should be further pointed out that the leading edge of the reflected pulse from reflecting and inverting delay line 17 should have the same slope as the trailing edge of the pulse at the input of delay line 17 coupled from cathode follower 16. A cathode follower is employed so that the impedance relationship illustrated in the shaper 2 is achieved, that is, the output impedance, $Z_{out}$, of the shaper is much less than the characteristic impedance, $Z_c$, of the storage device or delay line 17. The resistance 18 has a value equal to the characteristic impedance of delay line 17 to prevent reflections back down the delay line after the first traversal of the delay line by a driving pulse. At the input of center slicer 4, the pulse incident on the input of delay line 17 is combined with the reflected and inverted pulse from delay line 17 to produce a composite waveform substantially as illustrated by waveform 19. This composite waveform is produced by an algebraic addition of the incident pulse and the reflected pulse on the delay line 17 which has a delay time equal to one half the pulse width of the pulse being applied thereto.

It is required impedancewise that center slicer 4 have an input impedance, $Z_{in}$, much greater than the characteristic impedance, $Z_c$, of the delay line 17 and, further, that it establish a clipping level as illustrated by lines 20 and 21 such that a pulse is produced at terminal 5 whose leading edge 22 has a time position representative of the algebraically combined time position of the trailing and leading edge of pulse 15. This resultant time position is determined by the time position of edge 23 of pulse 19.

Referring to FIG. 2, there is illustrated in greater detail the combining action which takes place at the input of center slicer 4, and it will be demonstrated by the construction lines in FIG. 2 that the slope of the resultant pulse is doubled and the zero crossing is shifted in time by an amount equal to half the algebraic sum of the time shift of either of the edges. It is this reduction in shift of the combined waveform that provides the noise reduction in the circuit of this application. It should be remembered that the curves of FIG. 2 are only illustrative of the addition that will take place in the circuit of this invention at a particular instant of time. Hence, it will be possible for the leading edge to have noise and the trailing edge not to have noise, for the trailing edge to have noise and the leading edge not to have noise, and each edge having noise but in opposite polarity.

Curve A, FIG. 2 illustrates the result of combining the incident input wave with the reflected wave at the input of delay line 17 when there is no jitter or noise on the leading or trailing edge of the wave. An incident wave 25 (wave 15) having a leading edge 29 and a trailing edge 28 are applied to delay line 17. The incident wave 25 and the inverted reflected counterpart are combined algebraically to produce a new waveform which has an edge 23 whose slope is double the slope of the trailing and leading edges 28 and 29. In effect this amounts to a resultant pulse whose intermediate edge 23 is defined by the trailing edge 28 of pulse 25 and edge 29 of the inverted reflected coutnerpart of pulse 25, which is in reality the leading edge 29 of pulse 25. Further, the time position or shift in time position of edge 23 gives an indication of the time position of the time center of the pulse which is represented in curve A by line 30. Hence, a shift in time position of the resultant edge 23 due to the combination of the trailing and leading edges of a pulse from a source is representative of the time shift of the time center 30 of the pulse. Likewise, the resultant edge 23 or a shifted counterpart thereof is equivalent in time position to the combination of the trailing and leading edges of an incident wave.

The construction in curve B illustrates the resultant pulse that will occur when noise is contained on the leading edge of the pulse. The noise contained on the leading edge is illustrated in curve B by the dimension $\delta$, the new leading edge due to the shift in noise label 31. The trailing edge of the pulse 28 remains in the same time position, and the normal leading edge of the pulse is identified by dotted line 29. When this pulse is applied to delay line 17, there results the reflected and inverted counterpart at the input of center slicer 4 to be combined with the incident pulse thereon, the reflected counterpart having its normal leading edge identified by dotted line 29 and its shifted leading edge due to the noise identified as 31. The normal resultant of combining the trailing and leading edges of a pulse in accordance with this invention is identified by broken line 23. Under the arrangement of this system the algebraic combination of the new leading edge 31 due to the noise and the trailing edge 28 results in a waveform represented by the broken line 32. It will be observed that the time shift of line 32 with respect to line 23 at the zero crossover point is $\delta/2$, one half of the total shift due to the noise. The shift of edge 23 to its new position 32 is identical to the shift experienced by the time center of the pulse from point 30 to the new center identified as 33. Hence, by properly clipping the resultant pulse on lines 20 and 21, a new pulse 22 can be produced whose leading edge is shifted one half the amount of the leading edge of the pulse from the source and, further, a pulse whose leading edge is shifted an amount equal to the shift in the center of the received pulse.

Curve C illustrates in the form of geometric construction the resultant pulse when the trailing edge 28 is shifted an amount $\delta$ to produce a new trailing edge 34. When the incident pulse and the reflected and inverted pulse are combined at the input of slicer 4, it is again observed a double slope for the resultant edge, identified as 35, occurs and that resultant edge 35 is shifted $\delta/2$ at the zero crossover from the normal resultant edge 23. Hence, again, we have a reduction in noise, this reduction in noise automatically providing an improved signal-to-noise ratio. It should be observed also that in this arrangement the shift of the leading edge of the resulting pulse obtained by slicing along lines 20 and 21 is moved an amount equal to the time shift in the time center of the pulse, the distance from point 30 to point 36.

Curve D, FIG. 2 illustrates the reduction in noise that will be achieved by the circuit illustrated in FIG. 1 if there is noise on both the trailing and leading edges of a pulse. Leading edge 29 has been shown to be shifted by an amount $\delta_1$ by noise and is identified as 37, while the trailing edge 28 is shifted by an amount $\delta_2$ by noise and identified by 38. When the incident and reflected, inverted pulses are combined at the input of slicer 4, a resultant edge 39 is produced which is shifted $\delta_R$ from the usual edge 23 (the resultant edge without noise). This shift, $\delta_R$, is identical to the shift experienced by the time center of the pulse to the new position 40. It should be observed that the crossover of the resultant pulse is equal to $$\frac{(\delta_1-\delta_2)}{2}$$

which as before illustrates that the zero crossover of the resultant pulse due to noise shifts half the shift of either edge when the edges are considered in an algebraic fashion. Even in the condition illustrated in curve D, there is a noise reduction improvement.

Hence, it will be observed that in the arrangement disclosed by applicant that rather than attempting to provide an arrangement to increase the amplitude of the signal 100 percent and the noise only 41 percent, applicant has attacked the problem of reducing the noise by an amount approximately 30 percent. Thus, it may be further stated that the jitter due to noise pulse output of slicer 4 is only 71 percent of the algebraic sum of the jitter on the pulse applied to the circuit of this invention. This noise reduction comes about by the fact that the noise statistically on one edge as compared with that of the other edge is substantially equal and, further, that the noise occurs in a random relationship. It might be stated in the form of an equation as follows:

$$\pm n_1 \pm n_2 = \frac{1.414}{2} n_1$$

Hence, the resultant pulse has noise thereon equal to approximately 70.7 percent the noise on the original pulse. This represents a noise reduction and hence an improved signal-to-noise ratio for the pulse communication system.

The resultant improvement achieved by the circuit of this invention is only at a maximum 3 db, but this can be achieved by employing only a shaping circuit, a short-circuited delay line and a slicer in addition to the equipment of present systems, and it is possible for up to forty-five channels to receive the benefit of the noise reduction. It should be further pointed out that the threshold level employing the system of this invention is not improved directly but remains substantially the same as if the circuit were not employed therein.

While I have described above the principles of my invention in connection with specific apparatus, it is to be clearly understood that this description is made only by way of example and not as a limitation to the scope of my invention as set forth in the objects thereof and in the accompanying claims.

I claim:

1. A circuit to reduce noise in a pulse communication system comprising a source of pulses having the time position of their leading and trailing edges shifted in time in accordance with the noise in said system, and a pulse reshaper including an input circuit coupled to said source, an output circuit and means including a storage device coupled between said input and said output circuits to produce pulses at said output circuit having the time position of the leading edges shifted in time with respect to the time position of the trailing edge of the pulses of said source corresponding to the algebraically combined time position of the leading and trailing edges of the pulses of said source.

2. A circuit to reduce noise in a pulse communication system comprising a source of pulses having the time position of their leading and trailing edges shifted in time in accordance with the noise in said system, a storage device coupled to said source, a means to combine the output of said source and the output of said storage device to determine the shift of the time center of the pulses of said source due to the noise, and means coupled to said combining means to produce pulses having a leading edge whose time position is shifted with respect to the time position of the trailing edge of the pulses of said source an amount equal to the time shift of the time center of the pulses of said source.

3. A circuit to reduce noise in a pulse communication system comprising a source of pulses having the time position of their leading and trailing edges shifted in time in accordance with the noise in said system, a reflecting delay line having a time delay equal to substantially one half the width of the pulses of said source, means coupling a pulse of said source to the input of said delay line, and means coupled to the input of said delay line to combine the reflected pulse on said delay line with the pulse from said source to produce a pulse having a leading edge whose time position is shifted with respect to the time position of the trailing edge of the pulse of said source by an amount less than the time shift experienced by the leading edge of the pulse of said source due to said noise.

4. A circuit to reduce noise in a pulse communication system comprising a source of pulses having the time position of the leading and trailing edges shifted in time in accordance to the noise in said system, an inverting delay line having a time delay equal to substantially one half the width of the pulses of said source, means coupling a pulse of said source to the input of said delay line and means coupled to the input of said delay line to combine the inverted reflected pulse on said delay line with the pulse from said source to produce a pulse having a leading edge whose time position is shifted with respect to the time position of the trailing edge of the pulse of said source by an amount corresponding to the alegbraically combined time shift experienced by the leading and trailing edges of the pulse of said source.

5. A circuit to reduce noise in a pulse communication system comprising a source of pulses having the time position of the leading and trailing edges shifted in time in accordance with the noise in said system, a short-circuited delay line having a time delay equal to substantially one half the width of the pulses of said source, means coupling a pulse of said source to the input of said delay line, and means coupled to the input of said delay line to combine the reflected pulse on said delay line with the pulse from said source to produce a pulse having a leading edge whose time position is shifted with respect to the time position of the trailing edge of the pulse of said source by an amount less than the time shift experienced by the leading edge of the pulse of said source.

6. A circuit to reduce noise in a pulse communication system comprising a source of pulses having the time position of the leading and trailing edges shifted in time in accordance with the noise in said system, a pulse shaper coupled to said source to produce pulses having the slope of the leading and trailing edges equal, a short-circuited delay line coupled to the output of said shaper having a time delay equal to substantially one half the width of the pulses of said source, means coupling an output pulse of said shaper to the input of said delay line, and means coupled to the input of said delay line to combine the reflected pulse on said delay line with the output pulse from said shaper to produce a pulse having a leading edge whose time position is shifted with respect to the trailing edge of the pulse of said source by an amount less than the time shift experienced by the leading edge of the pulse of said source.

7. A circuit to reduce noise in a pulse communication system comprising a source of pulses having the time position of the leading and trailing edges shifted in time in accordance with the noise in said system, a shaper coupled to said source to produce a pulse whose leading and trailing edges have equal slope and the duration of the slope of said leading and trailing edges is the same order of magnitude as the expected time position shift due to the noise, an inverting delay line coupled to said shaper having a time delay equal to substantially one half the width of the pulses of said source, means coupling the output of said shaper to the input of said delay line, and means coupled to the input of said delay line to combine the reflected pulse on said delay line with the output pulse from said shaper to produce a pulse having a leading edge whose time position is shifted with respect to the trailing edge of the pulse of said source by an amount corresponding to the algebraically combined time shift experienced by the leading and trailing edges of the pulse of said source.

8. A circuit to reduce noise in a pulse communication system comprising a source of pulses having the time position of the leading and trailing edges shifted in time in accordance with the noise in said system, a center slicer coupled to said source to remove the center of a pulse of said source, a shaper coupled to said slicer to produce a pulse whose leading and trailing slopes are equal, an inverting delay line having a time delay equal to substantially one half the width of the pulses of said source, means coupling the pulse of said shaper to the input of said delay line, means coupled to the input of said delay line to combine the inverted reflected pulse on said delay line with the pulse from said shaper, and a slicing circuit coupled to said combiner means to produce a pulse having a leading edge whose time position is shifted by an amount less than the combined time shift experienced by the leading and trailing edges of the pulse of said source.

9. A circuit to reduce noise in a pulse communication system comprising a source of pulses including leading and trailing edges having given slopes and the time position thereof being shifted in time in accordance with the noise in said system, and a pulse reshaper including an input circuit coupled to said source, an output circuit and means including a storage device coupled between said input and output circuits to produce pulses at said output circuit including leading edges having a greater slope than the given slope of the leading edge of the pulses of said source and the time position thereof being shifted in time with respect to the time position of the trailing edge of the pulses of said source an amount corresponding to the algebraically combined time position of the leading and trailing edges of the pulses of said source.

10. A circuit to reduce noise in a pulse communication system comprising a source of pulses having the time position of their leading and trailing edges shifted in time in accordance with the noise in said system, a pulse reshaper coupled to said source, a storage device coupled to the output of said reshaper, and a slicer coupled to said storage device to produce pulses at the output thereof having the time position of the leading edge correspond in time to the algebraically combined time position of the leading and trailing edges of the pulses of said source.

11. A circuit to reduce noise in a pulse communication system comprising a source of pulses having the time position of their leading and trailing edges shifted in time in accordance with the noise in said system, a storage device coupled to said source, a means to combine the output of said source and the output of said storage device to determine the shift of the time center of the pulses of said source due to the noise, and a slicer coupled to said combining means to produce pulses having a leading edge whose time position is shifted an amount equal to the time shift of the time center of the pulses of said source.

12. A circuit to reduce noise in a pulse communication system comprising a source of pulses having the time position of their leading and trailing edges shifted in time in accordance with the noise in said system, a reflecting delay line having a time delay equal to substantially one half the width of the pulses of said source, means coupling a pulse of said source to the input of said delay line, and a slicer coupled to the input of said delay line to combine the reflected pulse on said delay line with the pulse from said source and to produce a pulse from the combined pulses having a leading edge whose time position is shifted an amount less than the time shift experienced by the leading edge of the pulse of said source due to said noise.

13. A circuit to reduce noise in a pulse communication system comprising a source of pulses having the time position of the leading and trailing edges shifted in time in accordance with the noise in said system, an inverting delay line having a time delay equal to substantially one half the width of the pulses of said source, means coupling a pulse of said source to the input of said delay line, and a slicer coupled to the input of said delay line to combine the inverted reflected pulse on said delay line with the pulse from said source and to produce a pulse from the combined pulses having a leading edge whose time position is shifted by an amount less than the algebraically combined time shift experienced by the leading and trailing edges of the pulse of said source.

14. A circuit to reduce noise in a pulse communication system comprising a source of pulses having the time position of the leading and trailing edges shifted in time in accordance with the noise in said system, a short-circuited delay line having a time delay equal to substantially one half the width of the pulses of said source, means coupling a pulse of said source to the input of said delay line, and a slicer coupled to the input of said delay line to combine the reflected pulse on said delay line with the pulse from said source and to produce a pulse from the combined pulses having a leading edge whose time position is shifted by an amount less than the time shift experienced by the leading edge of the pulse of said source.

15. A circuit to reduce noise in a pulse communication system comprising a source of pulses having the time position of the leading and trailing edges shifted in time in accordance with the noise in said system, a pulse shaper coupled to said source to produce pulses having the slope of the leading and trailing edges equal, a short-circuited delay line coupled to the output of said shaper having a time delay equal to substantially one half the width of the pulses of said source, means coupling an output pulse of said shaper to the input of said delay line, and a slicer coupled to the input of said delay line to combine the reflected pulse on said delay line with the output pulse from said shaper and to produce a pulse from the combined pulses having a leading edge whose time position is shifted by an amount less than the time shift experienced by the leading edge of the pulse of said source.

16. A circuit to reduce noise in a pulse communication system comprising a source of pulses having the time position of the leading and trailing edges shifted in time in accordance with the noise in said system, a shaper coupled to said source to produce a pulse whose leading and trailing edges have equal slope and the duration of the slope of said leading and trailing edges is the same order of magnitude as the expected time position shift due to the noise, an inverting delay line coupled to said shaped having a time delay equal to substantially one half the width of the pulses of said source, means coupling the output pulse of said shaper to the input of said delay line, and a slicer coupled to the input of said delay line to combine the reflected pulse on said delay line with the output pulse from said shaper and to produce a pulse from the combined pulses having a leading edge whose time position is shifted by an amount less than the algebraically combined time shift experienced by the leading and trailing edges of the pulse of said source.

17. A circuit to reduce noise in a pulse communication system comprising a source of pulses having the time position of their leading and trailing edges shifted in time in accordance with the noise in said system, a non-polarity inverting pulse reshaper including an input circuit coupled to said source and an output circuit, means including a storage device coupled to said output circuit, and means coupled to said storage device to produce pulses at the output thereof having the time position of the leading edge correspond in time to the algebraically combined time position of the leading and trailing edges of the pulses of said source.

18. A circuit to reduce noise in a pulse communication system comprising a source of pulses having the time position of the leading and trailing edges shifted in time in accordance with the noise in said system, a non-polarity inverting pulse shaper coupled to said source to produce pulses having the slope of the leading and trailing edges equal, a short-circuited delay line coupled to the output of said shaper having a time delay equal to substantially one half the width of the pulses of said source, means coupling the output pulse of said shaper to the input of said delay line, and means coupled to the input of said delay line to combine the reflected pulse on said line with the output pulse from said shaper to produce a pulse having a leading edge whose time position is shifted with respect to the trailing edge of the pulse of said source by an amount less than the time shift experienced by the leading edge of the pulse of said source.

19. A circuit to reduce noise in a pulse communication system comprising a source of pulses having the time position of the leading and trailing edges shifted in time in accordance wtih the noise in said system, a non-polarity inverting shaper coupling to said source to produce a pulse whose leading and trailing edges is the same order of magnitude as the expected time position shift due to the noise, an inverting delay line coupled to said shaper having a time delay equal to substantially one half the width of the pulses of said source, means coupling the output pulse of said shaper to the input of said delay line, and means coupled to the input of said delay line to combine the reflected pulse on said delay line with the output pulse from said shaper to produce a pulse having a leading edge whose time position is shifted by an amount less than the algebraically combined time shift experienced by the leading and trailing edges of the pulse of said source.

20. A circuit to reduce noise in a pulse communication system comprising a source of pulses including leading and trailing edges having given slopes and the time position thereof being shifted in time in accordance with the noise in said system, a non-polarity inverting pulse reshaper including an input circuit coupled to said source and an output circuit, means including a storage device coupled to said output circuit and means coupled to said storage device to produce pulses at the output thereof including leading edges having a greater slope than the given slope of the leading edge of the pulses of said source and the time position thereof corresponding in time to the algebraically combined time position of the leading and trailing edges of the pulses of said source.

References Cited in the file of this patent

UNITED STATES PATENTS

| | | |
|---|---|---|
| 2,145,332 | Bedford | Jan. 31, 1939 |
| 2,433,379 | Levy et al. | Dec. 30, 1947 |
| 2,436,662 | Norgoord | Feb. 24, 1948 |
| 2,444,438 | Grieg | July 6, 1948 |
| 2,802,102 | Imm | Aug. 6, 1957 |
| 2,807,015 | Shank | Sept. 17, 1957 |
| 2,890,335 | Gibbon | June 9, 1959 |
| 2,971,158 | Bleam | Feb. 7, 1961 |